US012645027B2

(12) United States Patent
Drake et al.

(10) Patent No.: US 12,645,027 B2
(45) Date of Patent: Jun. 2, 2026

(54) METHODS FOR PRODUCING HOLLOW-CORE OPTICAL FIBERS

(71) Applicant: CORNING INCORPORATED, Corning, NY (US)

(72) Inventors: Matthew Ryan Drake, Painted Post, NY (US); Richard Michael Fiacco, Corning, NY (US); Sushmit Sunil Kumar Goyal, Painted Post, NY (US); Brian Lee Harper, Painted Post, NY (US); Ming-Jun Li, Horseheads, NY (US); Matthew John Rice, Bath, NY (US); Matthew Artus Tuggle, Corning, NY (US)

(73) Assignee: CORNING INCORPORATED, Corning, NY (US)

( * ) Notice: Subject to any disclaimer, the term of this patent is extended or adjusted under 35 U.S.C. 154(b) by 142 days.

(21) Appl. No.: 18/225,947

(22) Filed: Jul. 25, 2023

(65) Prior Publication Data

US 2024/0036249 A1 Feb. 1, 2024

Related U.S. Application Data

(60) Provisional application No. 63/394,123, filed on Aug. 1, 2022.

(51) Int. Cl.
| | |
|---|---|
| *G02B 6/02* | (2006.01) |
| *C03B 37/027* | (2006.01) |
| *G02B 6/032* | (2006.01) |

(52) U.S. Cl.
CPC .... *G02B 6/02328* (2013.01); *C03B 37/02781* (2013.01); *G02B 6/032* (2013.01); *C03B 2203/16* (2013.01)

(58) Field of Classification Search
CPC .. C03C 25/26; G02B 6/02361; C03B 37/0256
See application file for complete search history.

(56) References Cited

U.S. PATENT DOCUMENTS

| | | | |
|---|---|---|---|
| 11,747,552 B1 * | 9/2023 | Cataletto | G02B 6/3807 |
| | | | 385/125 |
| 12,209,045 B2 | 1/2025 | Rosenberger et al. | |

(Continued)

FOREIGN PATENT DOCUMENTS

| | | | |
|---|---|---|---|
| IN | 202247001691 A | | 2/2022 |
| JP | 2018100206 A | * | 6/2018 |

(Continued)

OTHER PUBLICATIONS

Bufetov Igor et al., "Revolver Hollow Core Optical Fibers", FIBERS, vol. 6, No. 2, Jun. 7, 2018, 26 pages.

(Continued)

*Primary Examiner* — Eric Wong

(74) *Attorney, Agent, or Firm* — Kevin L. Bray

(57) ABSTRACT

The present disclosure is directed to various embodiments of methods for making an optical fiber. The methods may include drawing an optical fiber from a hollow-core preform. The hollow-core preform may include an annular support structure with an inner surface defining an interior cavity. The interior cavity may include a tube in direct contact with the inner surface of the annular support structure. The tube may include a wall defining an internal opening, the internal opening having a sealed end. The drawing may include regulating a pressure of the internal cavity to a predetermined pressure.

12 Claims, 11 Drawing Sheets

(56) References Cited

U.S. PATENT DOCUMENTS

| | | | |
|---|---|---|---|
| 2003/0172682 A1* | 9/2003 | Sato .................... | C03B 37/0122 65/393 |
| 2003/0230118 A1 | 12/2003 | Dawes et al. | |
| 2013/0114936 A1* | 5/2013 | Dong ................. | G02B 6/02328 385/125 |
| 2020/0278491 A1* | 9/2020 | Poletti ............... | G02B 6/02357 |
| 2022/0196907 A1* | 6/2022 | Poletti ............... | G02B 6/02328 |
| 2022/0234936 A1 | 7/2022 | Rosenberger et al. | |
| 2022/0363584 A1* | 11/2022 | Rosenberger ....... | C03B 37/0122 |
| 2023/0040327 A1 | 2/2023 | Fiacco et al. | |
| 2024/0034664 A1* | 2/2024 | Dainese, Jr. ....... | G02B 6/02361 |

FOREIGN PATENT DOCUMENTS

| | | | |
|---|---|---|---|
| WO | 2021/009213 A1 | 1/2021 | |
| WO | 2021/009222 A1 | 1/2021 | |
| WO | 2021/009224 A1 | 1/2021 | |
| WO | 2021/009227 A1 | 1/2021 | |
| WO | 2021/009231 A1 | 1/2021 | |
| WO | 2021/009236 A1 | 1/2021 | |

OTHER PUBLICATIONS

International Search Report and Written Opinion of the International Searching Authority; PCT/US2023/028757; dated Oct. 20, 2023; 11 pages; European Patent Office.

Xiaosheng Huang, "Hollow core antiresonant fibres for fibre laser applications", Doctoral Thesis, Nanyang Technological University 2017, 164 pages.

\* cited by examiner

METHODS FOR PRODUCING HOLLOW-CORE OPTICAL FIBERS

This application claims the benefit of priority under 35 U.S.C § 120 of U.S. Provisional Application Ser. No. 63/394,123 filed on Aug. 1, 2022, the content of which is relied upon and incorporated herein by reference in its entirety.

BACKGROUND

Field

The present specification generally relates to methods for producing optical fibers, and more specifically, to methods for producing hollow-core optical fibers.

Technical Background

Hollow-core optical fibers transmit light through a hollow core. Some hollow-core optical fibers include capillaries as cladding elements, but manufacturing such hollow-core optical fibers may be difficult. Specifically, maintaining the desired architecture when drawing a preform into hollow-core optical fiber may be challenging, because capillaries may collapse during the drawing process. Accordingly, there is a need for improved methods for manufacturing hollow-core optical fibers.

SUMMARY

According to a first aspect of the present disclosure, a method for producing an optical fiber comprises drawing hollow-core optical fiber from a hollow-core preform, the hollow-core preform comprising an annular support structure with an inner surface defining an internal cavity, the internal cavity comprising a sealed tube in contact with the inner surface, the sealed tube comprising a wall defining an internal opening, the internal opening having a sealed end, the drawing comprising regulating a pressure of the interior cavity to a predetermined pressure from −1.0 psig to 3.0 psig.

A second aspect of the present disclosure may include the first aspect or fifty-third through fifty-fourth aspects, wherein the internal cavity comprises two or more sealed tubes.

A third aspect of the present disclosure may include the first or second aspect or fifty-third through fifty-fourth aspects, wherein the interior cavity further comprises an open tube in contact with the inner surface, the open tube comprising a wall defining an internal opening, the internal opening lacking a sealed end.

A fourth aspect of the present disclosure may include any of the first through third aspects or fifty-third through fifty-fourth aspects, wherein the method further comprises forming the sealed end of the internal opening.

A fifth aspect of the present disclosure may include the fourth aspect or fifty-third through fifty-fourth aspects, wherein the forming sealed end comprises heating an end of the internal opening.

A sixth aspect of the present disclosure may include the fourth aspect or fifty-third through fifty-fourth aspects, wherein the forming sealed end comprises laser welding an end of the internal opening.

A seventh aspect of the present disclosure may include the fourth aspect or fifty-third through fifty-fourth aspects, wherein the forming sealed end comprises plasma welding an end of the internal opening.

An eighth aspect of the present disclosure may include the fourth aspect or fifty-third through fifty-fourth aspects, wherein the forming sealed end flame welding an end of the opening.

A ninth aspect of the present disclosure may include any of the first through eighth aspects or fifty-third through fifty-fourth aspects, wherein the sealed tube is in direct contact with the inner surface of the annular support structure.

A tenth aspect of the present disclosure may include any of the first through ninth aspects or fifty-third through fifty-fourth aspects, wherein the drawing varies a diameter of the hollow-core optical fiber, the capillary formed from the sealed tube during the draw.

An eleventh aspect of the present disclosure may include any of the first through tenth aspects or fifty-third through fifty-fourth aspects, wherein the drawing varies a thickness of the wall of a capillary of the optical fiber, the capillary formed from the sealed tube during the drawing.

A twelfth aspect of the present disclosure may include any of the first through eleventh aspects or fifty-third through fifty-fourth aspects, wherein the drawing varies a diameter of a hollow core of the hollow-core optical fiber, the hollow core formed from a hollow section of the interior cavity during the drawing.

A thirteenth aspect of the present disclosure may include any of the first through twelfth aspects or fifty-third through fifty-fourth aspects, wherein the drawing occurs at a temperature from 1700° C. to 2150° C.

A fourteenth aspect of the present disclosure may include any of the first through thirteenth aspects or fifty-third through fifty-fourth aspects, wherein the hollow-core preform is drawn at a rate from 10 m/min to 60 m/s.

A fifteenth aspect of the present disclosure may include any of the first through fourteenth aspects or fifty-third through fifty-fourth aspects, wherein the hollow-core preform is drawn at a tension from 30 g to 400 g.

A sixteenth aspect of the present disclosure may include any of the first through fifteenth aspects, wherein the predetermined pressure is varied in time.

A seventeenth aspect of the present disclosure may include any of the first through sixteenth aspects, wherein the predetermined pressure is from −0.5 psig to 2.0 psig.

An eighteenth aspect of the present disclosure may include any of the first through seventeenth aspects, wherein the regulating the pressure of the hollow cavity comprises increasing the pressure in the hollow cavity.

A nineteenth aspect of the present disclosure may include any of the first through seventeenth aspects, wherein the regulating the pressure of the hollow cavity comprises decreasing the pressure in the hollow cavity.

A twentieth aspect of the present disclosure may include any of the first through nineteenth aspects, wherein the regulating the pressure of the hollow cavity comprises passing one or more gasses into the hollow cavity.

A twenty-first aspect of the present disclosure may include any of the first through twentieth aspects, wherein the regulating the pressure of the hollow cavity comprises passing an inert gas into the hollow cavity.

A twenty-second aspect of the present disclosure may include any of the first through twenty-first aspects, wherein the regulating the pressure of the hollow cavity comprises passing air to into the hollow cavity.

A twenty-third aspect of the present disclosure may include any of the first through twenty-second aspects, wherein the regulating the pressure varies a diameter of a capillary of the hollow-core optical fiber, the capillary formed from the sealed tube.

A twenty-fourth aspect of the present disclosure may include any of the first through twenty-third aspects, wherein the regulating the pressure varies a thickness of the wall of a capillary of the hollow-core optical fiber, the capillary formed from the sealed tube A twenty-firth aspect of the present disclosure may include any of the first through twenty-fourth aspects, wherein the regulating the pressure varies a diameter of a hollow core of the hollow-core optical fiber, the hollow core formed from a hollow section of the interior cavity.

A twenty-sixth aspect of the present disclosure may include any of the first through twenty-fifth aspects or fifty-third through fifty-fourth aspects, wherein the annular support structure comprises silica-based glass.

A twenty-seventh aspect of the present disclosure may include any of the first through twenty-sixth aspects or fifty-third through fifty-fourth aspects, wherein the wall of the sealed tube comprises silica-based glass.

A twenty-eighth aspect of the present disclosure may include any of the first through twenty-seventh aspects or fifty-third through fifty-fourth aspects, wherein the internal cavity comprises one or more gasses.

A twenty-ninth aspect of the present disclosure may include any of the first through twenty-eighth aspects or fifty-third through fifty-fourth aspects, wherein the internal cavity consists essentially of air.

A thirtieth aspect of the present disclosure may include any of the first through twenty-ninth aspects or fifty-third through fifty-fourth aspects, wherein the internal cavity consists essentially of inert gas.

A thirty-first aspect of the present disclosure may include any of the first through thirtieth aspects or fifty-third through fifty-fourth aspects, wherein the hollow-core preform further comprises an overclad and the annular support structure is positioned between the overclad and the hollow cavity.

A thirty-second aspect of the present disclosure may include the thirty-first aspect or fifty-third through fifty-fourth aspects, wherein the overclad comprises silica-based glass.

A thirty-third aspect of the present disclosure may include any of the first through thirty-second aspects or fifty-third through fifty-fourth aspects, wherein the sealed tube comprises a nested tube, the nested tube in contact with an interior surface of the wall of the sealed tube.

A thirty-fourth aspect of the present disclosure may include the thirty-third aspect, wherein the nested capillary is in contact with the interior surface of the wall of the sealed tube at a point proximate to the inner surface of the annular support structure A thirty-fifth aspect of the present disclosure may include either the thirty-third or thirty-fourth aspect, wherein the nested tube is in direct contact with the interior surface of the wall of the sealed tube.

A thirty-sixth aspect of the present disclosure may include any of the thirty-third through thirty-fifth aspects, wherein the nested tube has a sealed end proximate to the sealed end of the internal opening of the sealed tube.

A thirty-seventh aspect of the present disclosure may include any of the thirty-third through thirty-sixth aspects, wherein the nested tube comprises silica-based glass.

According to a thirty-eighth aspect of the present disclosure, a hollow-core optical preform comprises an annular support structure with an inner surface defining an internal cavity, the internal cavity comprising a sealed tube in contact with the inner surface, the sealed tube comprising a wall defining an internal opening, the internal opening having a sealed end.

A thirty-ninth aspect of the present disclosure may include the thirty-eighth aspect or fifty-fifth through fifty-sixth aspects, wherein the sealed tube is in direct contact with the inner surface of the annular support structure.

A fortieth aspect of the present disclosure may include the thirty-eighth or thirty-ninth aspect or fifty-fifth through fifty-sixth aspects, wherein the hollow cavity comprises two or more of the sealed tubes.

A forty-first aspect of the present disclosure may include any of the thirty-eighth through fortieth aspects or fifty-fifth through fifty-sixth aspects, wherein the internal cavity further comprises an open tube in contact with the inner surface, the open tube comprising a wall defining a second internal opening, the second internal opening lacking a sealed end.

A forty-second aspect of the present disclosure may include the forty-first aspect, wherein the open tube is in direct contact with the inner surface of the annular support structure.

A forty-third aspect of the present disclosure may include any of the thirty-eighth through forty-second aspects or fifty-fifth through fifty-sixth aspects, wherein the annular support structure comprises silica-based glass.

A forty-fourth aspect of the present disclosure may include any of the thirty-eighth through forty-third aspects or fifty-fifth through fifty-sixth aspects, wherein the wall of the sealed tube comprises silica-based glass.

A forty-fifth aspect of the present disclosure may include any of the thirty-eighth through forty-fourth aspects or fifty-fifth through fifty-sixth aspects, wherein the internal cavity comprises one or more gasses.

A forty-sixth aspect of the present disclosure may include any of the thirty-eighth through forty-fifth aspects or fifty-fifth through fifty-sixth aspects, wherein the internal cavity consists essentially of air.

A forty-seventh aspect of the present disclosure may include any of the thirty-eighth through forty-sixth aspects or fifty-fifth through fifty-sixth aspects, wherein the internal cavity consists essentially of inert gas.

A forty-eighth aspect of the present disclosure may include any of the thirty-eighth through forty-seventh aspects or fifty-fifth through fifty-sixth aspects, wherein the sealed tube comprises a nested tube, wherein the nested tube contacts an interior surface of the wall of the sealed tube.

A forty-ninth aspect of the present disclosure may include the forty-eighth aspect, wherein the nested tube is in direct contact with the interior surface of the wall of the sealed tube.

A fiftieth aspect of the present disclosure may include the forty-eighth aspect or forty-ninth aspect, wherein the nested tube contacts the interior surface of the wall of the sealed tube at a point proximate to the inner surface of the annular support structure.

A fifty-first aspect of the present disclosure may include any of the forty-eighth through fiftieth aspects, wherein the nested tube has a sealed end proximate to the sealed end of the internal opening of the sealed tube.

A fifty-second aspect of the present disclosure may include any of the forty-eighth through fifty-first aspects, wherein the nested tube comprises silica-based glass.

According to a fifty-third aspect of the present disclosure, a method for producing a hollow-core optical fiber comprises drawing a hollow-core optical fiber from a hollow-core preform, the hollow-core preform comprising an annular support structure with an inner surface defining an interior cavity, the interior cavity having a sealed end and comprising a tube in contact with the inner surface.

A fifty-fourth aspect of the present disclosure may include the fifty-third aspect, wherein the tube is a sealed tube, the sealed tube comprising a wall defining an internal opening, the internal opening having a sealed end.

According to a fifty-fifth aspect of the present disclosure, a hollow-core optical fiber preform comprises an annular support structure with an inner surface defining an internal cavity, the internal cavity having a sealed end and comprising a sealed tube in contact with the inner surface, the sealed tube comprising a wall defining an internal opening, the internal opening having a sealed end.

A fifty-sixth aspect of the present disclosure may include the fifty-fifth aspect, wherein the tube is a sealed tube, the sealed tube comprising a wall defining an internal opening, the internal opening having a sealed end A fifty-seventh aspect of the present disclosure may include any of the first through fifty-sixth aspects, wherein the sealed end comprises a material of the tube fused to itself.

Additional features and advantages will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1A:
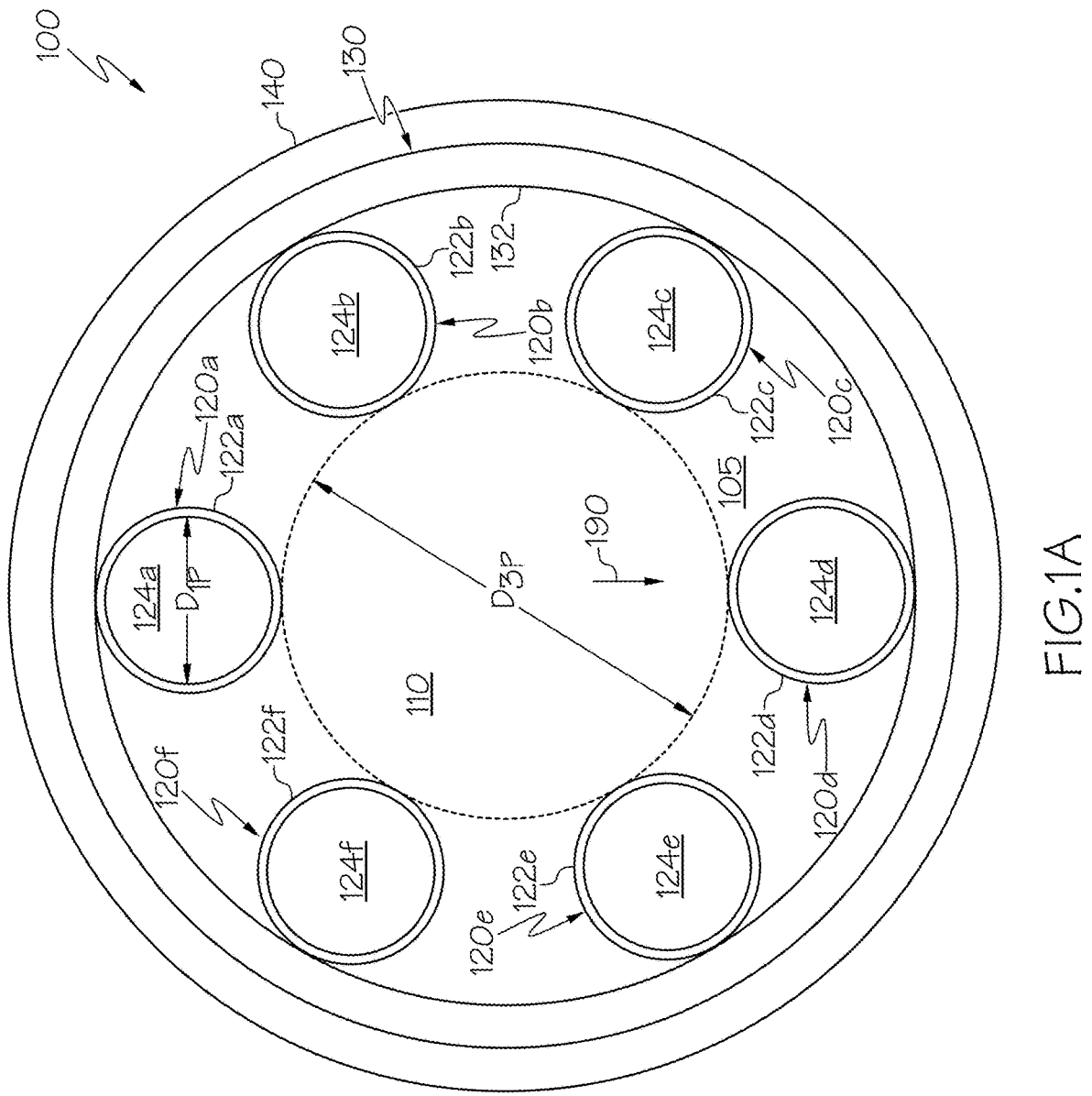
FIG. 1A schematically depicts a cross-sectional view of a hollow-core preform, according to one or more embodiments described herein.

Reference will now be made in detail to various embodiments of hollow-core optical fibers. Whenever possible, the same reference numerals will be used throughout the drawings to refer to the same or like parts. In embodiments, methods for producing a hollow-core optical fiber may comprise drawing an optical fiber from a hollow-core preform. The hollow-core preform may comprise an annular support structure with an inner surface defining a hollow cavity. The hollow cavity may comprise a tube in direct contact with the inner surface. The tube may comprise a wall defining an internal opening, and the internal opening may have a sealed end. The drawing may comprise regulating a pressure of the hollow cavity to a predetermined pressure.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation.

Various components described herein may be referred to as "directly connected" or indirectly connected". Components are directly connected when they are joined to one another with no intervening structure. Components may be joined by fusing, melting, welding, soldering, adhesives, or any other suitable attachment means. Components are "indirectly connected" when they are joined to one another with intervening structure. Examples of intervening structure include welding aids (e.g. frits, solders, fluxes), adhesives, and bonding materials. In embodiments, components connected indirectly are connected only by a welding aid, adhesive, or bonding material. The term "connected" means "directly connected" or "indirectly connected". Components "directly connected" to one another are said to be in direct contact with each other. Components "indirectly connected" to one another are said to be in indirect contact with each other. Components "connected" to one another are in direct or indirect contact with each other As used herein, the singular forms "a," "an" and "the" include plural referents unless the context clearly dictates otherwise. Thus, for example, reference to "a" component includes aspects having two or more such components, unless the context clearly indicates otherwise.

Hollow-core optical fibers may be produced by drawing a preform into fiber. Some hollow-core optical fibers include capillaries as cladding elements or cladding elements that include capillaries. The capillaries act to confine light to the hollow core of the fiber. The capillaries are formed from tubes in the preform used to form the hollow-core optical fiber. In conventional preforms, the tubes are directly connected to an annular support structure and centered about a hollow cavity of the preform. During draw of the preform, the tubes may collapse or otherwise deform. This may affect the shape or dimensions of capillaries formed from the tubes and reduce the effectiveness of capillaries as cladding elements to confine light to the hollow core of the fiber. To prevent collapse or deformation of the tubes, methods have been proposed to control the pressure within the tubes and the hollow cavity of the preform during the drawing process. However, controlling the pressure within the tubes and within the hollow cavity independently, especially at production scale or over long periods of time, has proven to be challenging. Conventional methods for controlling the pressure include inputting gas into the tubes and the hollow cavity of the preform separately, which requires multiple pressure manifolds and precise control of the pressure of each. Methods for producing a hollow-core optical fiber discussed herein simplify the process for controlling the pressure within the hollow cavity and the tubes of the preform independently. In particular, the methods disclosed herein include sealing one or more tubes of the preform at an end opposite to the end of the preform being drawn. The sealed ends enable control of the pressure in the tubes during the drawing process. A gas may be passed through the hollow cavity of the preform to control the difference in pressure between the hollow cavity and the tubes to prevent deformation or collapse of the tubes during the drawing process. This method may simplify the pressure manifold necessary to provide gas to the hollow cavity, as the manifold does not also need to provide or regulate delivery of gas to each tube separately. Additionally, the method simplifies pressure control, as the pressure difference between the hollow cavity and the tubes is adjusted by passing a gas through the hollow cavity, while the one or more of the tubes are sealed.

Methods for producing an optical fiber include drawing an optical fiber from a hollow-core preform. Referring now to FIG. 1A, the hollow-core preform 100 may comprise an annular support structure 130 with an inner surface 132 defining an interior cavity 105. The interior cavity 105 includes hollow section 110 and tubes 220. Hollow section 110 is the central portion of interior cavity 105 and corresponds to the hollow core region of a hollow-core optical fiber 200 drawn from hollow-core preform 100. Tubes 120 are in contact with the inner surface 132. In the embodiment depicted in FIG. 1A, tube 120a is in direct contact with the inner surface 132. It should be noted that the embodiment of the hollow-core preform 100 depicted in FIG. 1A includes six tubes, 120a, 120b, 120c, 120d, 120e, and 120f, which may be referred to generally as tube 120 or collectively as tubes 120. It should also be noted that similar notation is used for other repeated structures appearing in the figures of the present disclosure.

In embodiments, the hollow-core preform 100 may comprise two or more tubes 120. For example, without limitation, the hollow-core preform 100 may comprise two or more, three or more, four or more, five or more, or even six or more tubes 120. In embodiments, each tube 120 may be directly connected to inner surface 132 of the annular support structure 130. For example, without limitation, each tube 120 may be fused to inner surface 132 during production of the hollow-core preform 100.

In embodiments, each tube comprises a wall 122 (i.e., wall 122a, 122b, 122c, 122d, 122e, and 122f) defining an internal opening 124 (i.e., internal openings 124a, 124b, 124c, 124d, 124e, and 124f). In embodiments, at least one internal opening 124 of a tube 120 has a sealed end. In embodiments, at least two tubes 120 have an internal opening 124 having a sealed end. For example, without limitation, at least two, at least three, at least four, at least five or even at least six of the tubes 120 may have an internal opening 124 having a sealed end. In embodiments where multiple tubes 120 have an internal opening 124 having a sealed end, the sealed end of each tube 120 may be on the same end of the hollow-core preform 100. Tubes having a sealed end are referred to herein as "sealed tubes". Tubes lacking a sealed end are referred to herein as "open tubes". Open tubes have open ends. In embodiments, hollow-core preform 100 includes only sealed tubes, only open tubes, or a combination of sealed tubes and open tubes. Unless otherwise specified, reference numeral 120 refers to either a sealed tube or an open tube. When a distinction between sealed tubes and open tubes is needed in the description, the terms "sealed" and "open" will be added as qualifiers when referring to tubes 120 (e.g. "sealed tubes 120" or "open tubes 120"). In some embodiments, interior cavity 105 has a sealed end. An interior cavity 105 with a sealed end is referred to herein as a "sealed internal cavity". An internal cavity 105 lacking a sealed end is referred to herein as an "open internal cavity". In embodiments, hollow-core preform 100 includes an open interior cavity 105 and one or more tubes sealed 120. In embodiments, hollow-core preform 100 includes a sealed interior cavity 105 and one or more sealed tubes 120. In embodiments, hollow-core preform 100 includes a sealed interior cavity 105 and one or more open tubes 120. In embodiments with a sealed tube or a sealed interior cavity, the tube or interior cavity preferably has one sealed end and one open end. The one sealed end is preferably the end opposite the draw end of hollow-core preform 100.

The methods for producing an optical fiber described herein may include a preliminary step to form the sealed end of one or more of the tubes 120. In embodiments, an end of an open tube 120 may be heated to seal the end to form a sealed tube. For example, without limitation, a sealed end of a tube 120 may be formed by laser welding, plasma welding, flame welding, or by applying a bonding or filling compound to an open end. The heating may comprise heating an end of the tube 120 to a temperature suitable for softening the material of the tube 120 such that the material flows together, thereby sealing the end of the tube 120. The same methods may be used to form a sealed end of interior cavity 105. When forming a sealed end of a tube 120 by heating, laser welding, plasma welding, or flame welding, a material of the tube 120 fuses to itself to form a seal.

In embodiments, the hollow-core preform 100 further comprises an overclad 140. The overclad is in contact with an outer surface of the annular support structure 130. In an embodiment, the overclad is in direct contact with an outer surface of the annular support structure 130. In such embodiments, the annular support structure 130 may be positioned between the overclad 140 and the interior cavity 105.

Figure 2A:
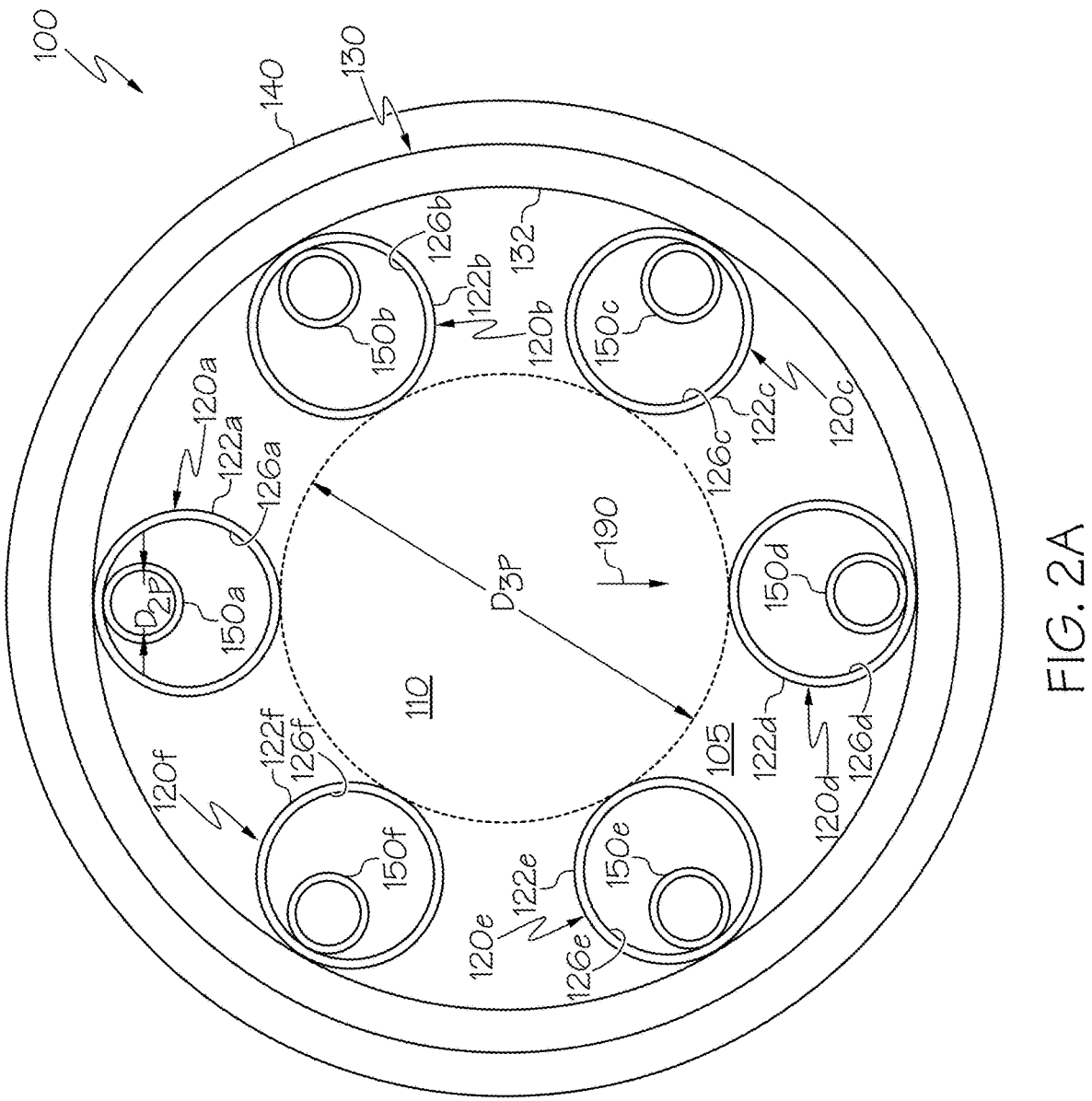
FIG. 2A schematically depicts a cross-sectional view of a hollow-core preform, according to one or more embodiments described herein.

Referring now to FIG. 2A, in embodiments, at least one tube 120 in the hollow-core preform 100 may comprise a nested tube 150. As described herein, a "nested tube" refers to a tube positioned within another tube such that an exterior surface of the nested tube is connected to an interior surface of the other tube. In embodiments, the nested tube 150 may directly contact an interior surface 126 of the wall 122 of the tube 120. For example, in the embodiment depicted in FIG. 2A, nested tube 150*a* is in direct contact with an interior surface 126*a* of the wall 122*a* of tube 120*a*. In embodiments, each tube 120 in the hollow-core preform 100 may comprise a nested tube 150 (i.e, nested tubes 150*a*, 150*b*, 150*c*, 150*d*, 150*e*, and 150*f* in the embodiment depicted in FIG. 2A).

In embodiments, the nested tubes 150 may be directly or indirectly connected to the interior surface 126 of the wall 122 of the tube 120 at a point proximate to the inner surface 132 of the annular support structure 130. As described herein, a point may be proximate to the annular support structure 130 when it is the closest point to the annular support structure 130 evaluated in a radial direction 190. In embodiments, a nested tube 150 may be directly or indirectly connected to the interior surface 126 of the wall 122 of the tube 120 at a point that is within 30° of the point proximate to the annular support structure 130. For example, without limitation, a nested tube 150 may be directly or indirectly connected to the interior surface 126 of the wall 122 of the tube 120 at a point that is within 30°, 25°, 20°, 15°, 10°, 5°, or even 1° of the point proximate to the annular support structure 130.

In embodiments, the nested tube 150 may comprise a sealed end proximate to the sealed end of the internal opening of a sealed tube 120. The nested tubes 150 may be sealed in the same manner as the tubes 120 in which they are positioned. For example, without limitation, the nested tubes 150 may be sealed by heating an end of the nested tubes 150. In embodiments, an end of the nested tubes 150 may be sealed by laser welding, plasma welding, or flame welding. The heating may comprise heating an end of the nested tube 150 to a temperature suitable for softening the material of the nested tube 150 such that the material flows together, thereby sealing the end of the nested tube 150.

In embodiments, the hollow-core preform 100 may have a draw end. As described herein, the "draw end" of the hollow-core preform 100 is the end of the preform from which optical fiber is drawn during the drawing process. In embodiments, the sealed ends of the internal openings 124 of tubes 120 are opposite the draw end of the hollow-core preform 100. In embodiments where the hollow-core preform 100 further comprises nested tubes 150, the sealed ends of the tubes 120 and the nested tubes 150 may be opposite the draw end of the hollow-core preform 100. In such embodiments, the draw ends of the tubes or nested tubes may be left open.

Without intending to be bound by theory, sealing one end of the tubes 120 (and nested tubes 150, when included) may produce positive pressure in the tubes during the drawing process. Sealing an end of the tubes 120 traps gas within the tubes 120 during the drawing process. As the gas is heated during the drawing process, the pressure of the gas within sealed tubes increases. This may result in constant pressure in the capillaries throughout the draw process, without the need for a separate apparatus configured to pressurize and independently control the pressure of the tubes 120. The temperature and ambient of the draw process establish and stabilize a gas pressure within sealed tubes 120. The stabilized gas pressure is consistent over time during the draw process and acts to prevents collapse of the tubes during draw. The gas pressure is also consistent and uniform across each of multiple sealed tubes 120. Consistency and uniformity in gas pressure in sealed tubes 120 promotes formation of hollow-core optical fibers drawn from hollow-core preform 100 that have capillaries with uniform dimensions (diameter and wall thickness) over extended lengths of fiber. It should be noted that, while the draw end of the tubes 120 remains open as the hollow-core preform 100 is initially heated during draw, the draw end of the tube 120 ultimately reaches a temperature during the draw at which glass at the draw end gobs to seal the draw end of the tubes as the fiber is drawn. The diameter of the capillaries 220 formed from the tubes 120 during the draw is sufficiently small that a constant pressure may be maintained in the tubes 120 as fiber is drawn during the draw process.

In embodiments, various components of the hollow-core preform 100 may comprise silica-based glass. Silica-based glass may include pure silica or silica that is doped with one or more dopants to modify the index of refraction or the viscosity of the silica. In embodiments, the annular support structure 130 may comprise silica-based glass. In embodiments, the wall 122 of one or more of the tubes 120 comprises silica-based glass. In embodiments, the wall 122 of each tube 120 consists or consists essentially of silica-based glass. In embodiments, one or more of the nested tubes 150 may comprise silica-based glass. In embodiments, the overclad 140 may comprise silica-based glass. Furthermore, in embodiments, any combination of the annular support structure 130, tubes 120, nested capillaries 150, and overclad 140 may comprise silica-based glass.

In embodiments, the hollow section 110, internal openings 124, and/or the space between tubes 120 comprise a gas. For example, without limitation, the hollow section 110, internal openings 124, and/or space between tubes 120 may comprise air. In embodiments, the hollow section 110, internal openings 124, and/or space between tubes 120 consists essentially of air or even consists of air. In some embodiments, the hollow section 110, internal openings 124, and/or space between tubes 120 consists essentially of an inert gas. As described herein, an inert gas refers to any gas that non-reactive during the drawing process. Inert gasses may include, but are not limited to, nitrogen, argon, and helium. For example, without limitation, the hollow section 110, internal openings 124, and/or the space between tubes 120 may consist essentially of one or more of nitrogen, argon, or helium.

Methods for producing a hollow-core optical fiber may include drawing the hollow-core preform 100 into optical fiber. The hollow-core preform 100 may be drawn from an end of the hollow-core preform 100 that is opposite to the sealed ends of the tubes 120 (or sealed ends of nested tubes or sealed end of an interior cavity, when included) in the hollow-core perform 100. The hollow-core perform 100 may be drawn in any suitable draw production system currently known in the art.

Figure 3:
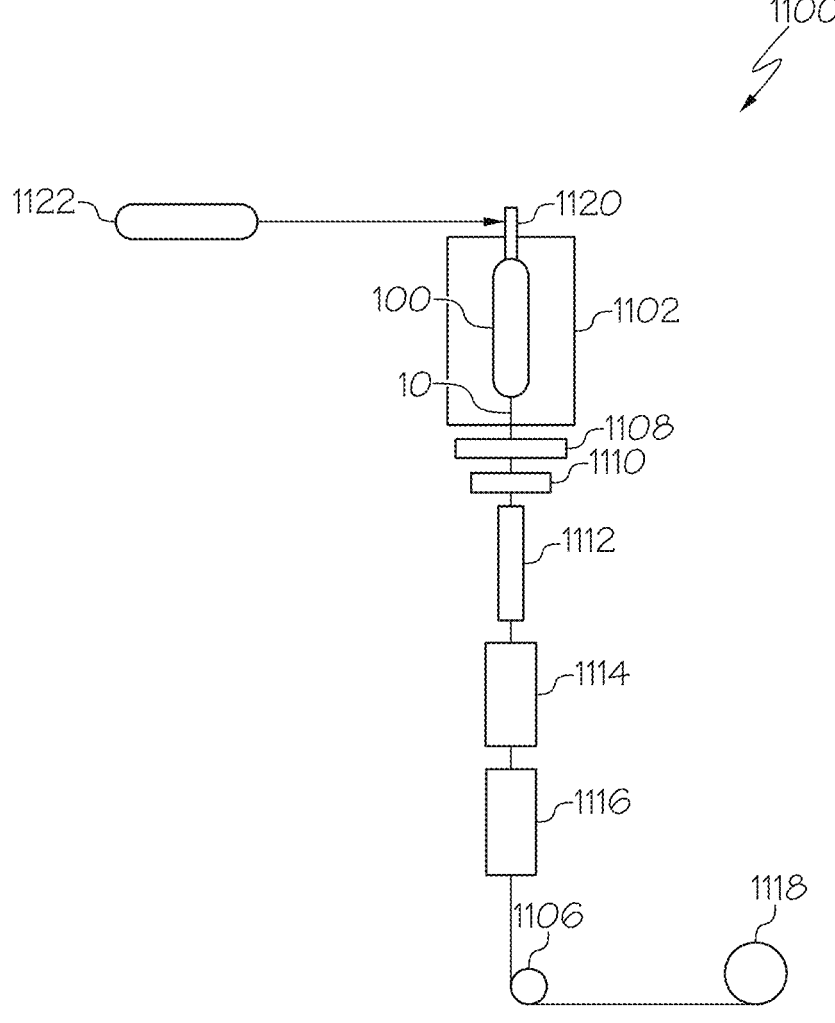
FIG. 3 schematically depicts a draw production system, according to one or more embodiments described herein.

For example, without limitation, the hollow-core preform 100 may be drawn into optical fiber in a draw production system 1100, schematically depicted in FIG. 3. The draw production system 1100 includes a draw furnace 1102 that is heated to an elevated temperature (e.g., greater than 1000° C.). The hollow-core preform 100 is disposed vertically in the draw furnace 1102 and the draw furnace 1102 supplies heat to the hollow-core preform 100. In embodiments, the draw furnace may have a hot zone from about 0.5 inches to about 1 inch positioned toward the bottom of preform 100 heated to a temperature sufficient to soften the draw (lower) end of preform 100 (e.g. a temperature of 1700° C. or higher); however, it should be understood that draw furnaces having larger or smaller hot zones may be used in the methods for producing hollow-core optical fiber described herein.

The draw production system 1100 comprises a manifold 1120 attached to the hollow-core preform 100. The manifold 1120 may be attached to the end of the hollow-core preform that is opposite the draw end of the hollow-core preform 100. The manifold 1120 may be fluidly connected to a gas supply 1122, and the manifold 1120 may be operable to supply gas to the hollow core of hollow-core preform 100. The flow of gas from gas supply 1122 to the hollow-core preform 100 via manifold 1120 may be controlled to regulate the pressure of the hollow core of the hollow-core preform 100 during the drawing process. The flow of gas from the gas supply 1122 to the hollow-core preform may be controlled by any suitable means. For example, without limitation, the flow rate of gas from the gas supply to the hollow-core preform 110 may be controlled manually or by an automated control system.

During the drawing of optical fiber, the optical fiber 10 is pulled from a bottom portion (softened draw end) of hollow-core preform 100 by tractor 1106. After leaving the draw furnace 1102, the optical fiber 10 encounters a diameter monitoring device 1108 that provides a signal used in a feedback control loop to regulate a speed of tractor 1106 and maintain a constant fiber diameter. The optical fiber 10 then passes through a fiber tension measurement device 1110 that measures the tension of the optical fiber 10 and provides a feedback control loop to regulate the tension of optical fiber 10 and maintain a desired draw tension setting.

Still referring to FIG. 3, once the optical fiber 10 is drawn from hollow-core preform 100, the optical fiber 10 is cooled in a cooling tube 1112 or other controlled cooling treatment device that may be coupled to or remote from the exit of the draw furnace 1102, afterwards optical fiber 10 is coated by coater 1114 that can apply a polymeric-based coating material to the outside surface of the optical fiber 10. The optical fiber 10 may also pass through a coating curing apparatus 1116 that cures the polymeric coating (e.g. with ultraviolet light). The optical fiber 10 is then wound onto a spool or reel 1118. Various optical attributes of the optical fiber, including the bandwidth are typically measured off-line.

Figure 1B:
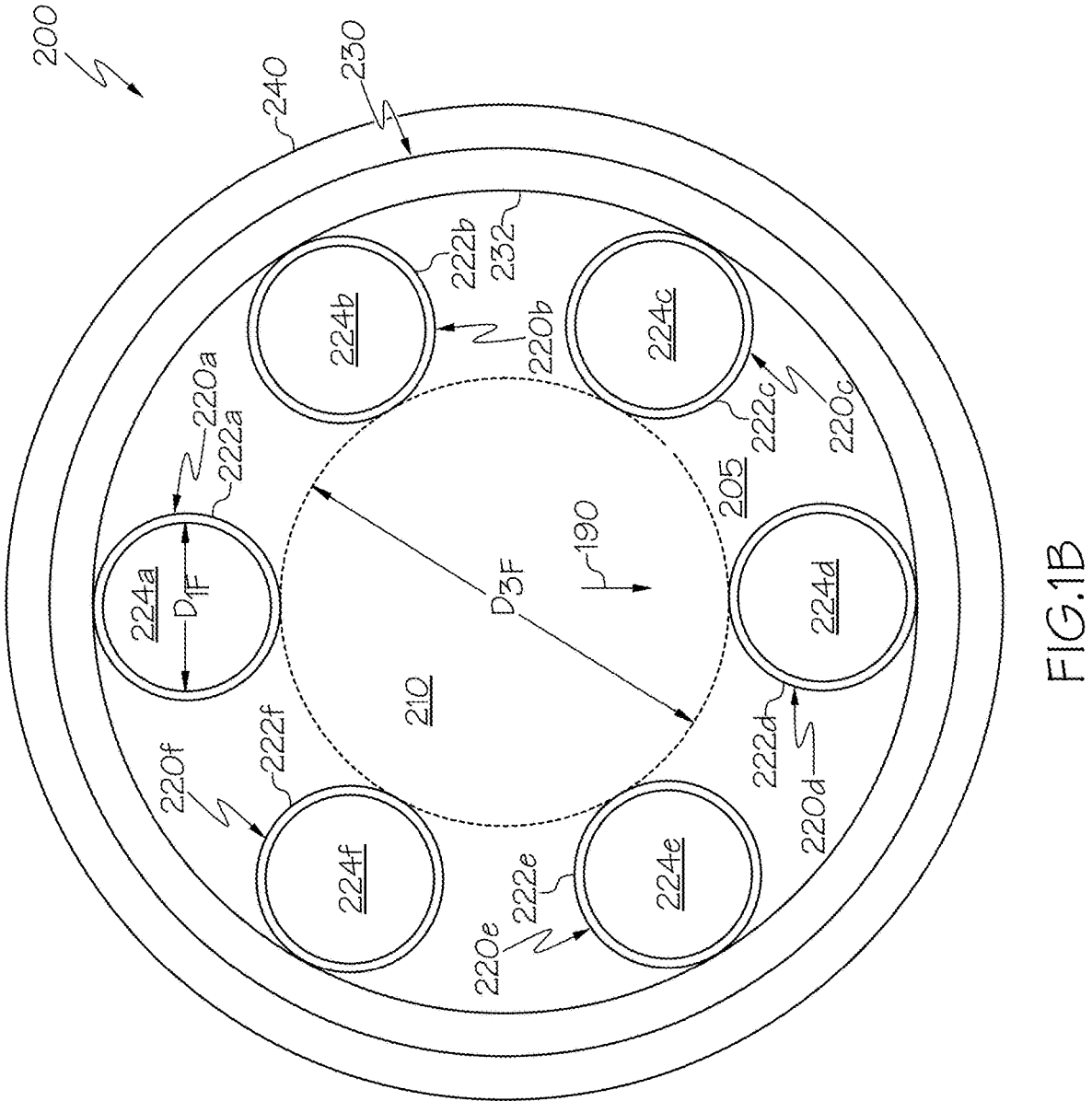
FIG. 1B schematically depicts a cross-sectional view of a hollow-core optical fiber drawn from a hollow-core preform, according to one or more embodiments described herein.

Referring now to FIG. 1B, a hollow-core optical fiber 200 is shown. Hollow-core optical fiber 200 can be formed, for example, by drawing the hollow-core preform 100 shown in FIG. 1A. The hollow-core optical fiber 200 may comprise a substrate 230 with an inner surface 232 defining an interior space 205. The interior space 205 includes hollow core 210 and capillaries 220. Hollow core 210 is the central portion of interior space 205 and corresponds to the region of hollow-core optical fiber 200 in which optical signals are confined. Capillaries 220 are cladding elements of hollow-core optical fiber 200. Capillaries 220 are in contact with inner surface 232. In the embodiment depicted in FIG. 1B, capillaries 220 are in direct contact with the inner surface 232. It should be noted that the embodiment of the hollow-core optical fiber 200 depicted in FIG. 1B includes six capillaries, 220a, 220b, 220c, 220d, 220e, and 220f, which may be referred to generally as capillary 220 or collectively as capillaries 220. Capillaries 220 are formed from corresponding tubes 120 of the hollow-core preform 100 during the draw process (e.g. capillary 220a is formed from tube 120a, etc.). Hollow core 210 is formed from hollow section 110 of the hollow-core preform 100. As hollow-core preform 100 is drawn, tubes 120 thin and contract in diameter to form capillaries 220 of hollow-core optical fiber 200. Corresponding thinning and contraction of annular support structure 130 to form substrate 230 occurs. Corresponding contraction of hollow section 110 to form hollow core 210 also occurs. Hollow-core optical fiber 200 can be viewed as a scaled down version of hollow-core preform 100. As further discussed hereinbelow, variation of the pressure in internal cavity 105 of hollow-core preform 100 during draw and/or sealing of tubes 120 of hollow-core preform 100 enable control over the diameter and wall thickness of capillaries 220 and substrate 230 as well as the diameter of hollow core 210.

In embodiments, the hollow-core optical fiber 200 may comprise two or more capillaries 220. For example, without limitation, the hollow-core optical fiber 200 may comprise two or more, three or more, four or more, five or more, or even six or more capillaries 220. In embodiments, each capillary 220 may be in direct contact with inner surface 232 of the substrate 230.

In embodiments, each capillary 220 comprises a wall 222 (i.e., wall 222a, 222b, 222c, 222d, 222e, and 222f) defining an internal opening 224 (i.e., internal openings 224a, 224b, 224c, 224d, 224e, and 224f).

In embodiments, the hollow-core optical fiber 200 further comprises an overclad 240 derived from overclad 140 of hollow-core preform 100. The overclad 240 is in contact with an outer surface of the substrate 230. In an embodiment, the overclad 240 is in direct contact with an outer surface of the substrate 230. In such embodiments, the substrate 230 is positioned between the overclad 240 and the hollow core 210.

Figure 2B:
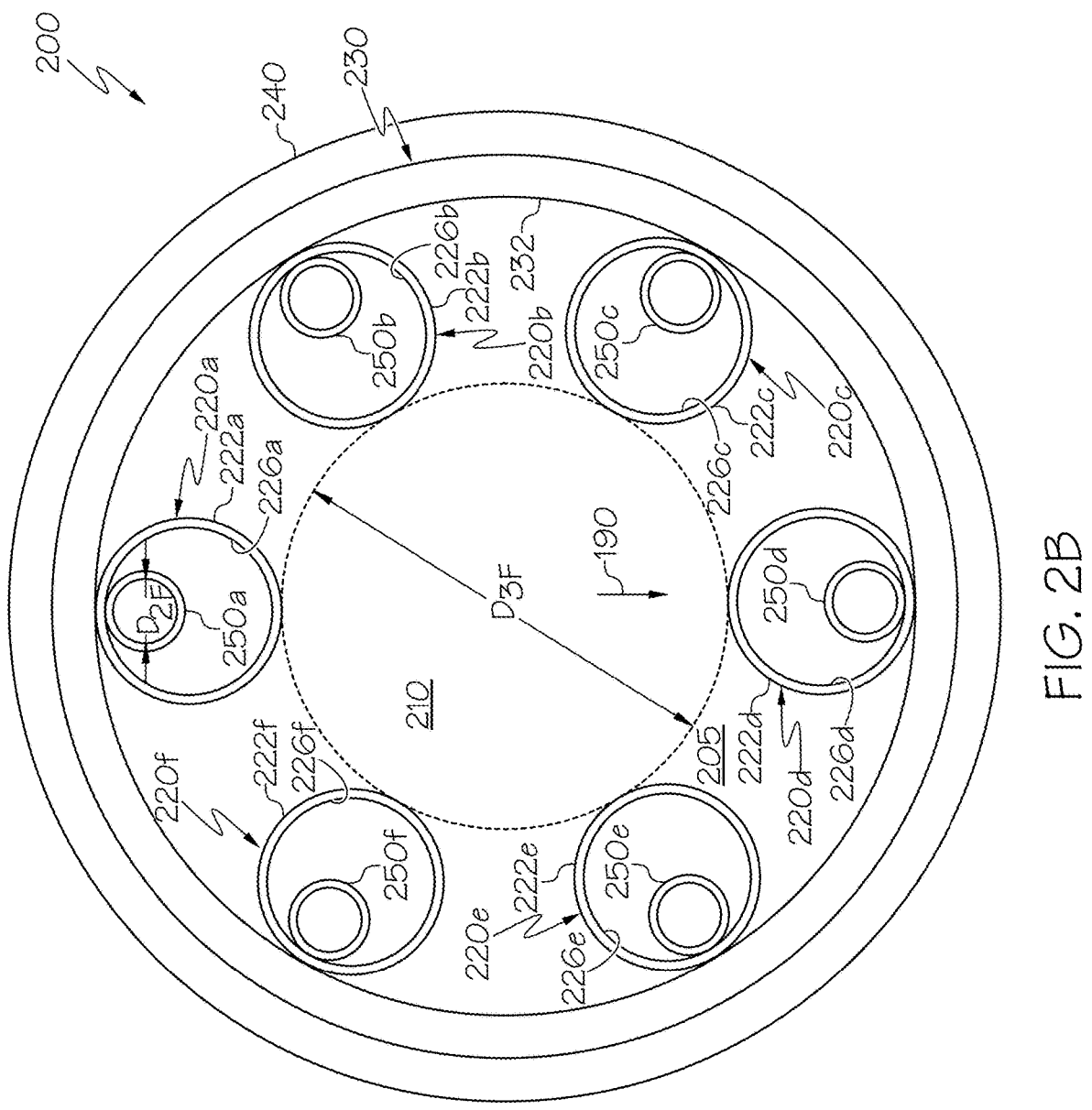
FIG. 2B schematically depicts a cross-sectional view of a hollow-core optical fiber drawn from a hollow-core preform, according to one or more embodiments described herein.

Referring now to FIG. 2B, a hollow-core optical fiber 200 is shown. Hollow-core optical fiber 200 can be formed, for example, by drawing the hollow-core preform 100 shown in FIG. 2A. in embodiments, at least one capillary 220 in the hollow-core optical fiber 200 may comprise a nested capillary 250. As described herein, a "nested capillary" refers to a capillary positioned within another capillary such that an exterior surface of the nested capillary is connected to an interior surface of the other capillary. In embodiments, the nested capillary 250 may directly contact an interior surface 226 of the wall 222 of the capillary 220. For example, in the embodiment depicted in FIG. 2B, nested capillary 250a is in direct contact with an interior surface 226a of the wall 222a of capillary 220a. In embodiments, each capillary 220 in the hollow-core optical fiber 200 may comprise a nested capillary 250 (i.e, nested capillaries 250a, 250b, 250c, 250d, 250e, and 250f in the embodiment depicted in FIG. 2B).

In embodiments, the nested capillaries 250 may be directly or indirectly connected to the interior surface 226 of the wall 222 of the capillary 220 at a point proximate to the inner surface of the substrate 230. As described herein, a point may be proximate to the substrate 230 when it is the closes point to the substrate 230 evaluated in a radial direction 190. In embodiments, a nested capillary 250 may be directly or indirectly connected to the interior surface 226 of the wall 222 of the capillary 220 at a point that is within 30° of the point proximate to the substrate 230. For example, without limitation, a nested capillary 250 may be directly or indirectly connected to the interior surface 226 of the wall 222 of the capillary 220 at a point that is within 25°, 20°, 15°, 10°, 5°, or even 1° of the point proximate to the substrate 230.

Referring again to FIG. 1A, in embodiments, drawing the hollow-core preform 100 varies an inner diameter $D_{1p}$ of the internal opening 124 of one or more of the tubes 120 to form capillaries 220 with inner diameter $D_{1f}$. In particular, without limitation, drawing the hollow-core preform 100 may decrease an inner diameter $D_{1p}$ of the internal opening 124 of one or more of the tubes 120 to an inner diameter $D_{1f}$ when forming capillaries 220. The capillary inner diameter $D_{1f}$ is particularly easy to control when forming capillaries 220 from sealed tubes 120. In embodiments, drawing the hollow-core preform 100 may decrease the inner diameter $D_{1p}$ of the internal opening 124 of each tube 120 to form a plurality of capillaries 220 with the inner diameter $D_{1f}$. The inner diameter $D_{1f}$ is, for example, without limitation, from 12 μm to 50 μm, from 16 μm to 50 μm, from 20 μm to 50 μm, from 24 μm to 50 μm, from 28 μm to 50 μm, from 32 μm to 50 μm, from 36 μm to 50 μm, from 40 μm to 50 μm, from 44 μm to 50 μm, from 48 μm to 50 μm, from 12 μm to 46 μm, 12 μm to 42 μm, from 12 μm to 38 μm, from 12 μm to 34 μm, from 12 μm to 30 μm, from 12 μm to 26 μm, from 12 μm to 22 μm, from 12 μm to 18 μm, from 12 μm to 16 μm, or any combination or sub-set of these ranges. In embodiments, each capillary may have the same inner diameter. In embodiments, such as the embodiment depicted in FIG. 2A, drawing the hollow-core preform 100 varies an inner diameter $D_{2p}$ of one or more of the nested tubes 150 to form nested capillaries 250 having an inner diameter $D_{2f}$. For example, without limitation, drawing the hollow-core preform 100 may decrease the inner diameter $D_{2p}$ of one or more of the nested tubes 150, or even each of the nested tubes 150, to form nested capillaries 250 with inner diameter $D_{2f}$.

In embodiments, drawing the hollow-core preform 100 varies a diameter $D_{3p}$ of the hollow section 110. As described herein, a diameter $D_{3p}$ of the hollow section 110 is the diameter of a circle that is concentric with the annular support structure 130 and tangent to the tubes 120, depicted as circle 170 in FIGS. 1 and 2. The region associated with diameter $D_{3p}$ is the hollow section 110, which defines the hollow core 210 of the hollow-core optical fiber 200 drawn from hollow-core preform 100. Circle 170 defines the boundaries of hollow section 110 of interior cavity 105. The diameter $D_{3p}$ is twice the radius of the hollow section 110, where the radius of the hollow section 110 is the shortest distance from the center of the hollow section 110 to the outer surface 122 of tubes 120. In embodiments in which the inner diameter $D_{1p}$ and wall thickness is the same for each of the tubes 120, the radius of the hollow section 110 is the same for all tubes 120. In some embodiments, small differences in $D_{1p}$ and/or wall thickness of the tubes 120 may arise during manufacturing. In such embodiments, the radius of the hollow section 110 is taken to be the smallest of the radii to the different tubes 120; that is, the shortest of the distances from the center of hollow section 110 to a point of tangency with a tube 120. In embodiments, drawing the hollow-core preform 100 may decrease a diameter $D_{3p}$ of the hollow section 110 to form hollow core 210 having a diameter $D_{3f}$ in hollow-core optical fiber 200.

The hollow-core preform 100 may be drawn at a temperature of from 1700° C. to 2150° C. For example, without limitation, drawing the hollow-core preform 100 may occur at a temperature from 1700° C. to 2150° C., from 1700° C. to 2100° C., from 1700° C. to 2050° C., from 1700° C. to 2000° C., from 1700° C. to 1950° C., from 1700° C. to 1900° C., from 1700° C. to 1850° C., from 1700° C. to 1800° C., from 1700° C. to 1750° C., from 1750° C. to 2150° C., from 1800° C. to 2150° C., from 1850° C. to 2150° C., from 1900° C. to 2150° C., from 1950° C. to 2150° C., from 2000° C. to 2150° C., from 2050° C. to 2150° C., from 2100° C. to 2150° C., or any combination or sub-set of these ranges.

In embodiments, hollow-core optical fiber 200 may be drawn from the hollow-core preform 100 at a rate from 0.1 m/s to 60 m/s. For example, without limitation, hollow-core optical fiber 200 may be drawn from the hollow-core preform 100 at a rate from 0.1 m/s to 60 m/s, from m/s to 60 m/s, from 1 m/s to 60 m/s, from 5 m/s to 60 m/s, from 10 m/s to 60 m/s, from 20 m/s to 60 m/s, from 30 m/s to 60 m/s, from 40 m/s to 60 m/s, from 50 m/s to 60 m/s, from 0.1 m/s to m/s, from 0.1 m/s to 40 m/s, from 0.1 m/s to 30 m/s, from 0.1 m/s to 20 m/s, from 0.1 m/s to m/s, from 0.1 m/s to 5 m/s, from 0.1 m/s to 1 m/s, from 0.1 m/s to 0.5 m/s, or any combination or sub-set of these ranges.

In embodiments, the hollow-core preform 100 may be drawn at a tension from 30 g to 400 g to form hollow-core optical fiber 200. For example, without limitation, the hollow-core preform 100 may be drawn at a tension from 30 g to 400 g, from 50 g to 400 g, from 100 g to 400 g, from 150 g to 400 g, from 200 g to 400 g, from 250 g to 400 g, from 300 g to 400 g, from 350 g to 400 g, from 30 g to 350 g, from 30 g to 300 g, from 30 g to 250 g, from 30 g to 200 g, from g to 150 g, from 30 g to 100 g, from 30 g to 50 g, or any combination or sub-set of these ranges.

Drawing the hollow-core preform 100 may include regulating a pressure of the interior cavity 105 to a predetermined pressure. In embodiments, the predetermined pressure may be varied over time during the draw. Without intending to be bound by theory, the predetermined pressure may be a pressure that prevents the collapse or deformation of tubes 120 during the drawing process. During the drawing process, the pressure in the tubes 120 may be greater than the pressure in the interior cavity 105, to prevent collapse of the capillaries. Adjusting the difference in pressure between the tubes 120 and the interior cavity 105 may allow the inner diameter $D_{1p}$ of the internal opening 124 of the tubes 120 and the diameter $D_{3p}$ of the hollow section 110 of the hollow-core preform 110 to be controlled. When the tubes 120 are sealed, adjusting the difference in pressure between the pressure in the capillaries and the pressure in the interior cavity 105 may be achieved by adjusting the pressure of the interior cavity 105. In embodiments, the pressure of the interior cavity 105 may be regulated by passing one or more gasses through or into the interior cavity 105 through a manifold.

In embodiments, the predetermined pressure of the internal cavity 105 may be from pound-force per square inch (gauge) (psig) to 1.0 psig (689.5 Pascal (Pa) (gauge) to 6895 Pa (gauge)) (where 0.0 psig=14.7 psia (pound-force per square inch (absolute)). For example, without limitation, the predetermined pressure may be from −2.0 psig to 4.0 psig, from −1.0 psig to 3.0 psig, from −0.5 psig to 2.0 psig, from 0.0 psig to 1.5 psig, from 0.1 psig to 1.0 psig, from 0.2 psig to 1.0 psig, from 0.3 psig to 1.0 psig, from 0.4 psig to 1.0 psig, from 0.5 psig to 1.0 psig, from psig to 1.0 psig, from 0.7 psig to 1.0 psig, from 0.8 psig to 1.0 psig, from 0.9 psig to 1.0 psig, from 0.1 psig to 0.9 psig, from 0.1 psig to 0.8 psig, from 0.1 psig to 0.7 psig, from 0.1 psig to 0.6 psig, from 0.1 psig to 0.5 psig, from 0.1 psig to 0.4 psig, from 0.1 psig to 0.3 psig, from 0.1 psig to 0.2 psig, or any combination or sub-set of these ranges.

The effect of varying the pressure of interior cavity 105 on the pressure in openings 124 of tubes 120 differs for open tubes 120 and sealed tubes 120. The pressure in openings 124 of open tubes 120 will correspond closely to the pressure of interior cavity 105. The pressure in openings 124 of sealed tubes 120, however, will differ from the pressure of interior cavity 105 because the sealed ends of sealed tubes 120 prevent continuous flow of gases introduced into interior cavity 105 through sealed tubes 120. The pressure in openings 124 of sealed tubes 120 is preferably greater than the pressure in interior cavity 105. In embodiments with a sealed interior cavity 105, a differential in the pressure of openings 124 of tubes 120 (whether sealed or open) and the pressure in sealed interior cavity 105 may also develop. For example in some embodiments, since the diameter of openings 124 is much smaller than the diameter of hollow section 110, delivery of gas to a sealed interior cavity 105 may lead to differential flow rates of gas into open or sealed tubes 120 and sealed interior cavity 105. A difference in gas flow rate may lead to a difference in pressure that enables control of the diameter of capillaries formed from sealed tubes when drawing a hollow-core preform 100 having an interior cavity 105 with a sealed end.

In embodiments, regulating the pressure of the interior cavity 105 comprises increasing the pressure in the interior cavity 105. Without intending to be bound by theory, increasing the pressure in the interior cavity 105 during the drawing process (relative to a baseline pressure) may decrease the inner diameter $D_{1f}$ of the internal opening 224 of the capillaries 220 in the hollow-core optical fiber (relative to the inner diameter $D_{1f}$ at the baseline pressure). As the inner diameter $D_{1f}$ of the internal opening 224 of capillaries 220 decreases, the diameter $D_{3f}$ of the hollow core 210 increases and the wall thickness of the internal openings 224 of capillaries 220 increases.

In embodiments, regulating the pressure of the internal cavity 105 comprises decreasing the pressure in the internal cavity 105. For example, a baseline pressure may be established in the internal cavity 105 and the pressure of internal cavity 105 may be reduced from the baseline pressure to influence the inner diameter $D_{1p}$ of the internal openings 124 of tubes 120 and/or the inner diameter $D_{1f}$ of the internal openings 224 of capillaries 220. Without intending to be bound by theory, decreasing the pressure in the internal cavity 105 during the drawing process may increase the inner diameter $D_{1p}$ of the internal openings 124 of tubes 120 and/or the inner diameter $D_{1f}$ of the internal openings 224 of the capillaries 220 in the hollow-core optical fiber 200. The wall thickness of tubes 120 may also decrease as the inner diameter $D_{1p}$ increases. Additionally, decreasing the pressure in the internal cavity 105 may decrease the diameter $D_{3p}$ of the hollow section 110 of hollow-core preform 100 and/or the diameter $D_{3f}$ of the hollow core 210 of the hollow-core optical fiber 200.

In embodiments, regulating the pressure of the internal cavity 105 comprises passing one or more gasses into the internal cavity 105. In embodiments, the one or more gasses may comprise one or more inert gasses. For example, the one or more inert gasses may comprise nitrogen, argon, and helium. In embodiments, the one or more gasses may comprise air.

The one or more gasses may be passed to the internal cavity 105 through a manifold (for example, manifold 1120 in FIG. 3). In embodiments, methods for producing hollow-core optical fibers 200 may comprise attaching a manifold 1120 to the hollow-core preform 100 before drawing hollow-core preform 100 to form hollow-core optical fiber 200. The manifold 1120 may be any apparatus suitable to pass one or more gasses to the internal cavity 105 during the drawing process. The manifold 1120 may be attached to the hollow-core preform 100 by any suitable means. For example, without limitation, the manifold 1120 may be formed of glass and may be welded to the hollow-core preform 100. It should be understood that the manifold 1120 may be attached to the hollow-core preform 100 proximate to the sealed ends of the tubes 120. As such, the manifold 1120 may be used to supply a gas to the internal cavity 110 of the hollow-core preform 100 without also introducing gas into the sealed ends of the tubes 120 (and nested tubes 150, when included). Accordingly, the inclusion of tubes 120 with sealed ends (and nested tubes 150 with sealed ends, when included) may simplify the connection of the manifold 1120 to the hollow-core preform 100 by eliminating the need for individual manifold 1120 connections to the tubes 120 (and nested tubes 150, when included) to separately and independently regulate the pressure within each tube.

Drawing the hollow-core preform 100 may produce a hollow-core optical fiber 200. As noted above, drawing the hollow-core preforms 100 depicted in FIGS. 1A and 2A produce the hollow-core optical fibers 200 depicted in FIGS. 1B and 2B, respectively. The number, arrangement, and dimensions of tubes 120 in hollow-core preform 100 can be varied to produce hollow-core optical fibers 200 of various designs. Further, by regulating the pressure of internal cavity 105 during the draw, the inner diameter $D_{1f}$ of openings 224 of capillaries 220, the inner diameter $D_{2f}$ of openings of nested capillaries 250, the wall thickness of capillaries 220 and nested capillaries 250, and the diameter $D_{3f}$ of hollow core 210 of hollow-core optical fiber 200 can be controlled when drawing hollow-core optical fiber 200 from a given hollow-core preform 100. That is, by regulating the pressure in the internal cavity 105 during draw, a variety of hollow-core optical fibers 200 with differing internal dimension can be produced from the same hollow-core preform 100. For example, the pressure in the internal cavity 105 can be regulated to a first pre-determined pressure over a first time interval during draw of a particular hollow-core preform 100 to produce a hollow-core optical fiber 200 have a first set of internal dimensions and regulated to a second pre-determined pressure over a second time interval to produce a hollow-core optical fiber 200 having a second set of internal dimensions.

In embodiments, the capillaries 220 of hollow-core optical fiber 200 are configured, by regulating the pressure in internal cavity 105 of hollow-core preform 100 to a pre-determined pressure, to provide an anti-resonant effect to increase confinement of an optical signal in hollow core 210.

As used herein, an "anti-resonant effect" refers to an effect that occurs when the thickness of a material (e.g. the wall thickness of capillaries 220) is proportional to a wavelength of light passing through the hollow-core optical fiber such that the light passing through the hollow-core optical fiber is confined to the hollow core. Without intending to be bound by theory, an anti-resonant effect occurs when the thickness of a material satisfies the quarter-wave condition (phase accumulated on a single pass is one quarter of $2\pi$, and any odd multiple of a quarter wave). When this condition is applied to the thickness of the material, light is confined to the hollow core with minimum leakage to the cladding. In other words, this condition helps inhibit coupling between core modes and cladding modes, resulting in low loss of transmission and increased confinement of the optical signal in the hollow core. The anti-resonant effect, in one embodiment, may be satisfied by a material having a thickness given by Equation 1:

$$t_{AR} = \frac{(2m-1)\lambda}{\left(4\{n^2-1\}^{1/2}\right)} \qquad \text{Equation 1}$$

In Equation 1, $t_{AR}$ is the thickness of the material that satisfies the anti-resonance condition, $\lambda$ is the wavelength of the optical signal, m is an integer that is greater than or equal to 1, and n is the refractive index of the material. It should be noted that Equation 1 represents an ideal thickness of a material that would satisfy the anti-resonant effect, and that material thicknesses that are not exactly equal to $t_{AR}$ may also provide increased confinement of light to the hollow core. For example, without limitation, it is contemplated that a material having a thickness within 10% of $t_{AR}$ (from 90% $t_{AR}$ to 110% $t_{AR}$) may be operable to confine light to the hollow core.

In embodiments, the capillaries 220 are anti-resonant elements that may be operable to confine an optical signal to the hollow core by an inhibited coupling mechanism. As used herein, an "inhibited coupling mechanism" refers to an effect that occurs when cladding elements having negative curvature inhibit coupling between core modes and cladding modes to reduce light leakage from the hollow core. As used herein, "negative curvature" refers to cladding elements having a surface with a convex shape facing the central longitudinal axis of the hollow-core optical fiber. Without intending to be bound by theory, using cladding elements having a surface with a convex shape facing the central longitudinal axis of the hollow-core optical fiber may reduce the amount of light that contacts the cladding elements and may also reduce the light leaking through the cladding elements and the gaps between these cladding elements. In turn, this may reduce attenuation of the optical signal due to the leaking through the cladding elements and the gaps between them and may also reduce light scattering that may occur when light contacts the surface of the cladding elements.

EXAMPLES

The embodiments described herein will be further clarified by the following examples.

Example 1—Production of an Optical Fiber with Constant Centerline Pressure

An optical fiber was produced from a hollow-core preform comprising an annular support structure, an overclad, one sealed tube and five open tubes arranged as shown in FIG. 1. The annular support structure, overclad, and tubes comprised silica-based glass. A core handle was welded to the hollow-core preform. The core handle included a manifold operable to pass gas to an internal cavity of the hollow-core preform. The sealed end of the one sealed tube was disposed proximate the core handle and opposite the draw end. The hollow-core preform was gobbed at the draw end at a temperature of 1975° C. to begin the draw process. The hollow-core optical fiber was drawn at a temperature of 1925° C. The downward feed of the hollow-core preform was 7 mm/min and the draw speed of the hollow-core optical fiber was about 20 m/min. No centerline pressure was applied to the internal cavity of the hollow-core preform during the drawing process. The outer diameter of the drawn hollow-core optical fiber was approximately 250 μm.

Figure 4C:
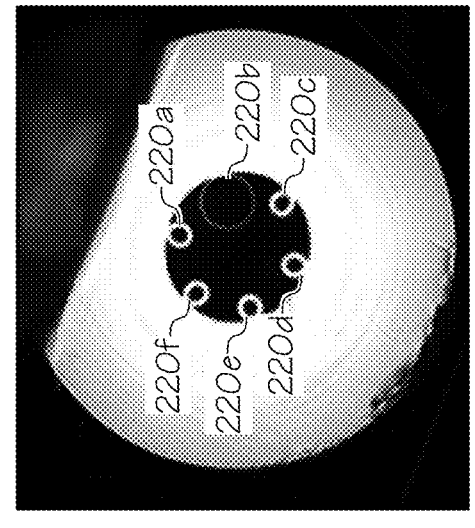
FIG. 4C depicts a cross-section of the hollow-core optical fiber of Example 1.
Figure 4F:
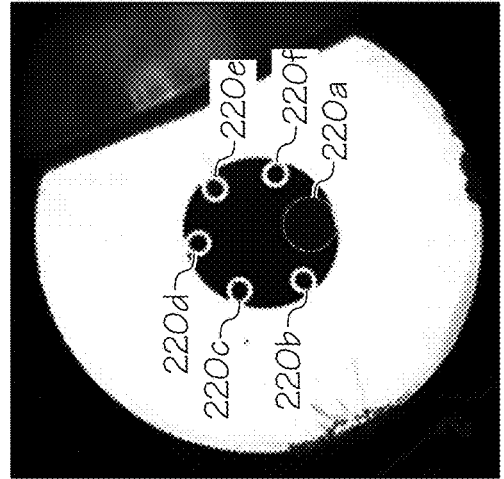
FIG. 4F depicts a cross-section of the hollow-core optical fiber of Example 1.
Figure 4B:
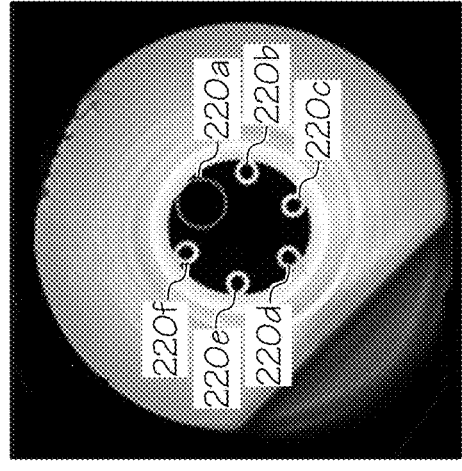
FIG. 4B depicts a cross-section of the hollow-core optical fiber of Example 1.
Figure 4E:
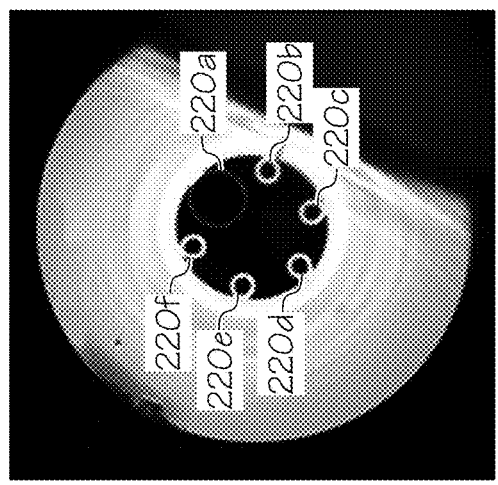
FIG. 4E depicts a cross-section of the hollow-core optical fiber of Example 1.
Figure 4A:
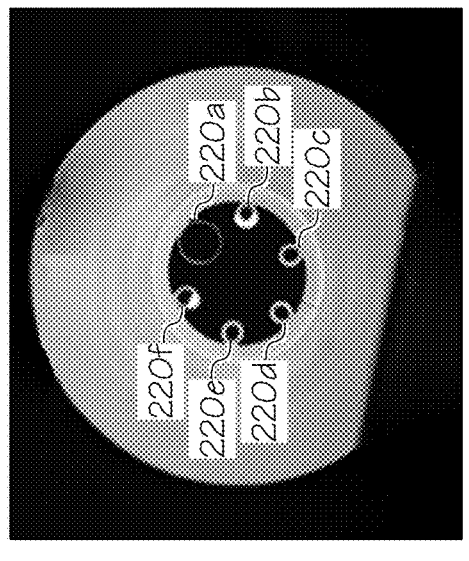
FIG. 4A depicts a cross-section of the hollow-core optical fiber of Example 1.
Figure 4D:
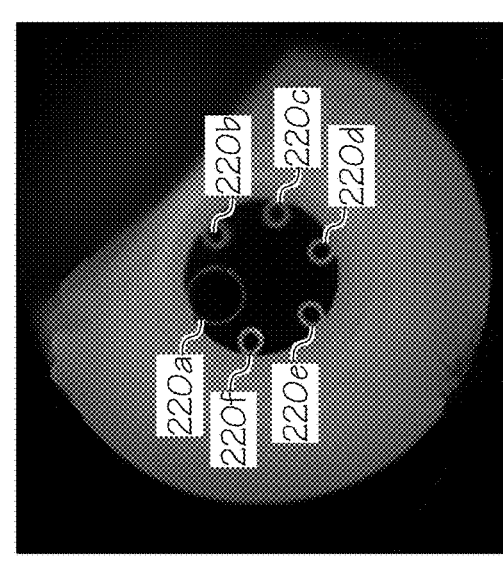
FIG. 4D depicts a cross-section of the hollow-core optical fiber of Example 1.

The hollow-core optical fiber was cut in cross section and observed every 5 to 10 minutes during the draw to determine how the sealed capillary behaved relative to the open capillaries. FIGS. 4A-4F are images of a cross section of the optical fiber over time. The times, after initiation of the draw, associated with FIGS. 5A-5F are 17 min, 22 min, 28 min, 38 min, 50 min, and 62 min, respectively. As shown in FIGS. 5A-5F, capillary 220a was formed from a sealed tube of the hollow-core preform and capillaries 220b, 220c, 220d, 220e, and 220f were formed from open tubes of the hollow-core preform. Capillaries formed from sealed tubes and open tubes are referred to herein as "sealed capillaries" and "open capillaries", respectively. FIGS. 4A-4C show how the diameter of sealed capillary 220a increased over time, and FIGS. 4D-4F show how the diameter of sealed capillary 220a stabilized at a diameter of about 30 μm for draw times above about 30 min (corresponding to a draw length of about 600 m). Open capillaries 220b, 220c, 220d, 220e, and 220f remained the same diameter throughout the draw process. The inner diameter and outer diameter of the sealed capillary 220a over time are depicted graphically in FIG. 5.

Figure 5:
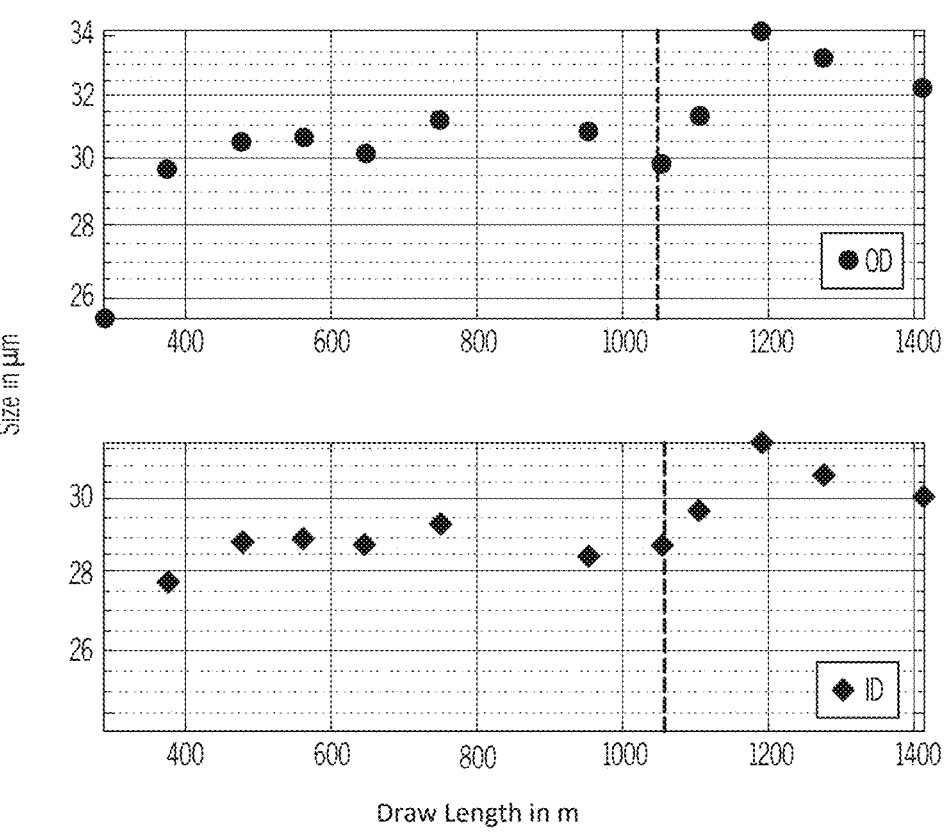
FIG. 5 graphically depicts the diameter of a capillary of the hollow-core optical fiber of Example 1 as a function of centerline pressure.

After 1000 m of fiber was drawn, the downward feed of the hollow-core preform was increased to 9 mm/min to examine whether the stabilization of the diameter of the sealed capillary 220a occurred under different conditions. After the downward feed rate was increased, the inner diameter and outer diameter of the sealed capillary also increased and then stabilized, as shown in FIG. 5. In FIG. 5, the vertical dashed line indicates the point at which the downward feed rate was increased.

Example 2—Production of an Optical Fiber with Varying Centerline Pressure

An optical fiber was produced from a hollow-core preform comprising an annular support structure, an overclad, one sealed tube and five open tubes arranged as shown in FIG. 1. The annular support structure, overclad, and tubes comprised silica-based glass. A core handle was welded to the hollow-core preform. The core handle included a manifold operable to pass gas to a hollow core of the hollow-core preform and to provide pressure to the internal cavity of the hollow-core preform. The sealed end of the one sealed tube was disposed proximate the core handle and opposite the draw end. The hollow-core preform was gobbed at the draw end at a temperature of 1975° C. to begin the draw process. The hollow-core optical fiber was drawn at a temperature of 1925° C. The downward feed of the hollow-core preform was 7 mm/min and the draw speed of the hollow-core optical fiber was about 20 m/min. Argon was passed to the internal cavity of the hollow-core preform through the core handle to control the pressure in the internal cavity during the drawing process. The outer diameter of the drawn optical fiber was approximately 250 μm.

Figure 6C:
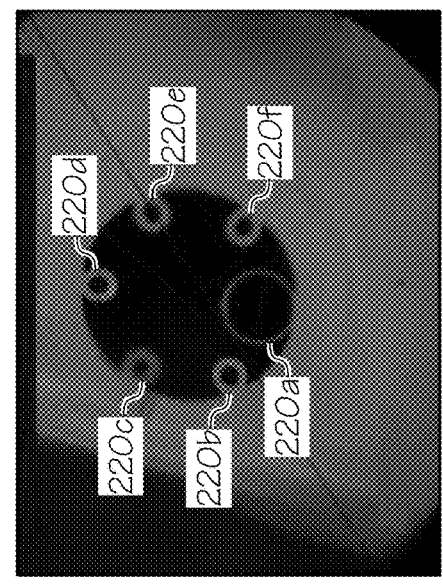
FIG. 6C depicts a cross-section of the hollow-core optical fiber of Example 2.
Figure 6F:
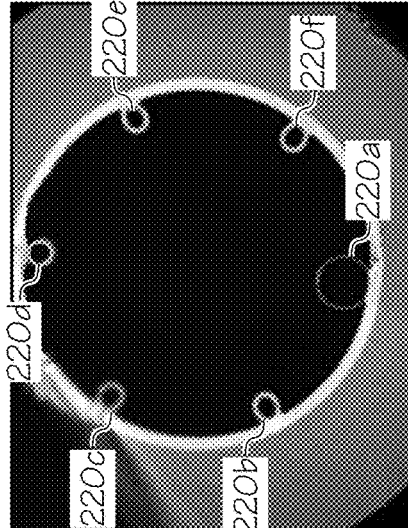
FIG. 6F depicts a cross-section of the hollow-core optical fiber of Example 2.
Figure 6B:
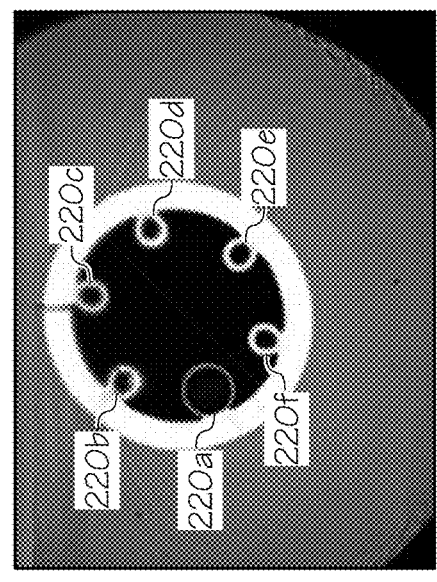
FIG. 6B depicts a cross-section of the hollow-core optical fiber of Example 2.
Figure 6E:
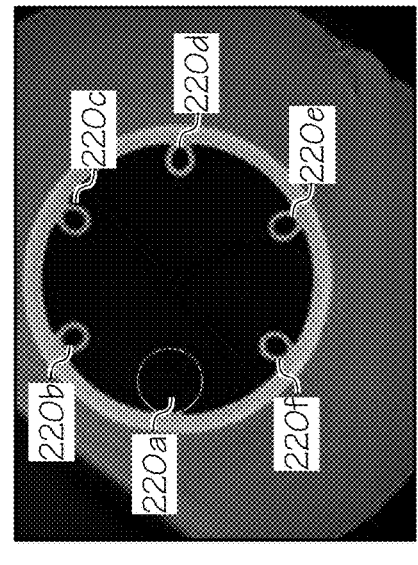
FIG. 6E depicts a cross-section of the hollow-core optical fiber of Example 2.
Figure 6A:
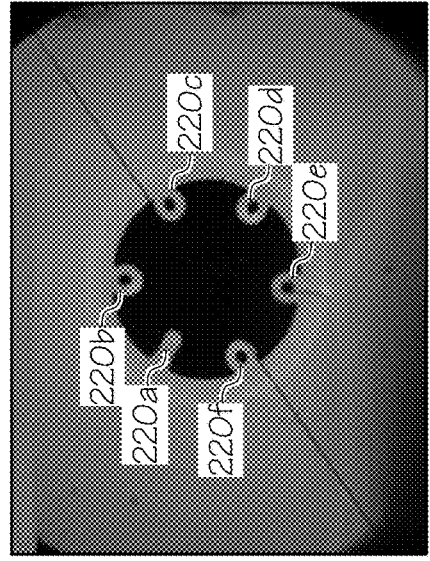
FIG. 6A depicts a cross-section of the hollow-core optical fiber of Example 2.
Figure 6D:
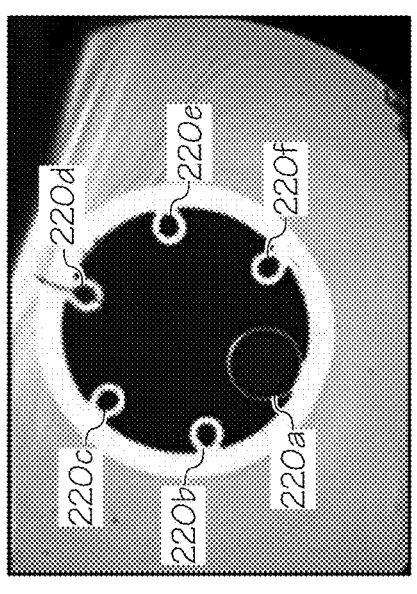
FIG. 6D depicts a cross-section of the hollow-core optical fiber of Example 2.
Figure 7:
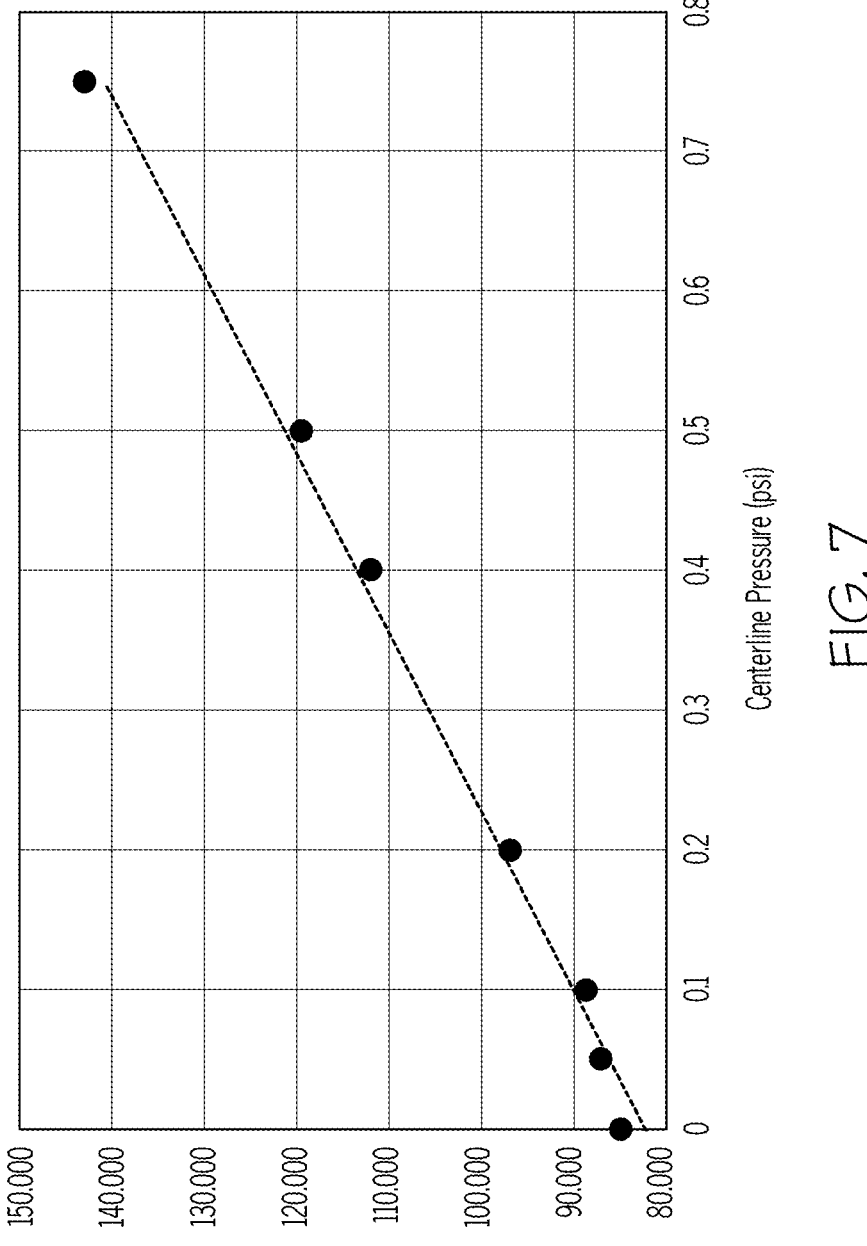
FIG. 7 graphically depicts the diameter of the hollow core of the hollow-core optical fiber of Example 2 as a function of centerline pressure.
Figure 8:
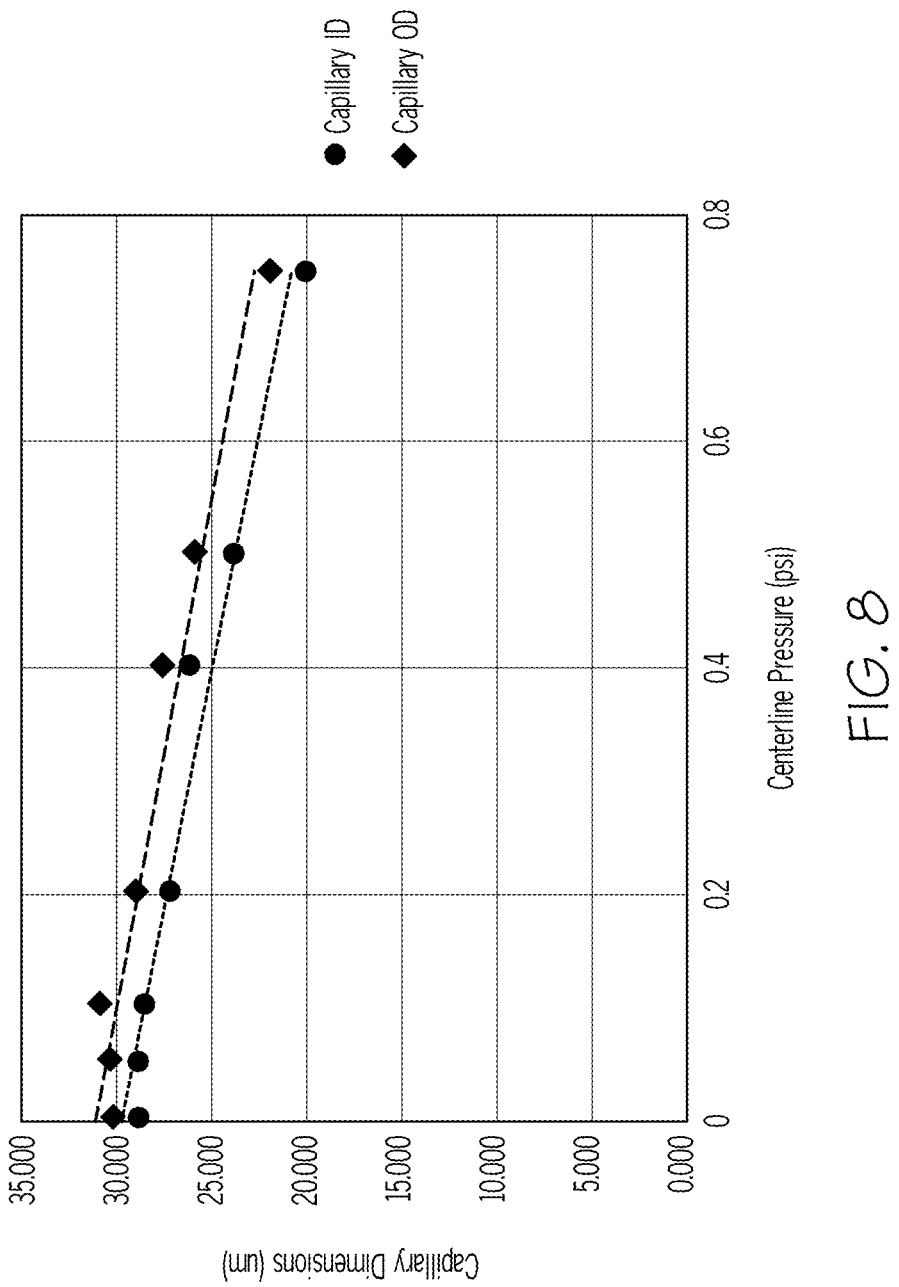
FIG. 8 graphically depicts the inner and outer diameters of a capillary of the hollow-core optical fiber of Example 2 as a function of centerline pressure.

The optical fiber was cut and observed every 5 to 10 minutes to determine how the sealed capillary behaved relative to the open capillaries. FIGS. 6A-6F are images of a cross section of the hollow-core optical fiber over time. As shown in FIGS. 6A-6F, capillary 220a was sealed, and capillaries 220b, 220c, 220d, 220e, and 220f were open. FIGS. 6A-6C show how the diameter of sealed capillary 220a increased over time when no pressure was added to the internal cavity. The pressure of the internal cavity of the hollow-core optical fiber cross-sections depicted in FIGS. 6A-6C was the baseline pressure associated with the process and process ambient (approximately 1 atm). The diameter of sealed capillary 220*a* shown in FIG. 6C corresponds to the stabilized diameter of sealed capillary 220*a* under conditions in which no regulation of the pressure of the internal cavity of the hollow-core preform occurred. After reaching the condition shown in FIG. 6C, the draw process was modified to regulate the pressure in the internal cavity of the hollow-core preform. A controlled pressure of inert gas was introduced to the internal cavity to increase the pressure above the baseline pressure. FIG. 6D shows the effect of increasing the pressure by 0.2 psi. Specifically, in FIG. 6D, the diameter of sealed capillary 220*a* was observed to decrease. FIG. 6E shows the effect of increasing the pressure by 0.4 psi, and FIG. 6F shows the effect of increasing the pressure by 0.75 psi. FIGS. 6E and 6F indicate that the diameter of sealed capillary 220*a* continually decreased as the pressure in the internal cavity was increased. Open capillaries 220*b*, 220*c*, 220*d*, 220*e*, and 220*f*, in contrast, remained the same diameter throughout the draw process. The diameter of the hollow core (labeled "Fiber Inner Diameter"), and the inner diameter and outer diameter of sealed capillary 220*a* (labeled "Capillary ID" and "Capillary OD", respectively) at different centerline pressures (pressure applied to the internal cavity) are graphically depicted in FIGS. 7 and 8, respectively. As shown in FIGS. 6A-6F, 7, and 8, the diameter of a sealed capillary may be controlled by changing the centerline pressure applied to the internal cavity of the preform. Additionally, a diameter of the hollow core may be controlled by changing the centerline pressure applied to the internal cavity.

Example 3—Production of an Optical Fiber with Six Sealed Capillaries

An optical fiber was produced from a hollow-core preform comprising an annular support structure, an overclad, and six sealed capillaries arranged as shown in FIG. 1. The annular support structure, overclad, and capillaries comprised silica-based glass. A core handle was welded to the hollow-core preform. The core handle included a manifold operable to pass gas to an internal cavity of the hollow-core preform and to provide pressure to an internal cavity of the preform. The sealed ends of the six sealed tubes were disposed proximate the core handle and opposite the draw end. The preform was gobbed at the draw end at a temperature of 1975° C. to begin the draw process. The hollow-core optical fiber was drawn at a temperature of 1925° C. The downward feed of the hollow-core preform was 7 mm/min and the draw speed of the hollow-core optical fiber was about 20 m/min. Argon was passed to the hollow core through the core handle to increase the pressure in the internal cavity (relative to the process baseline pressure) during the drawing process by 0.5 psi. The outer diameter of the drawn optical fiber was approximately 250 μm.

Figure 9B:
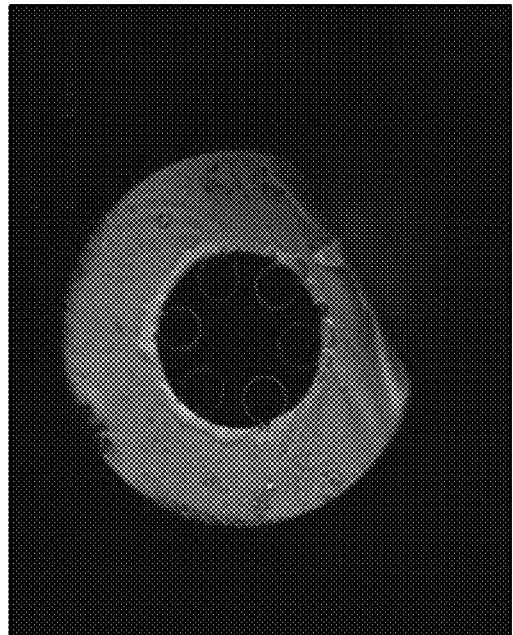
FIG. 9B depicts a cross section of the hollow-core optical fiber of Example 3.
Figure 9A:
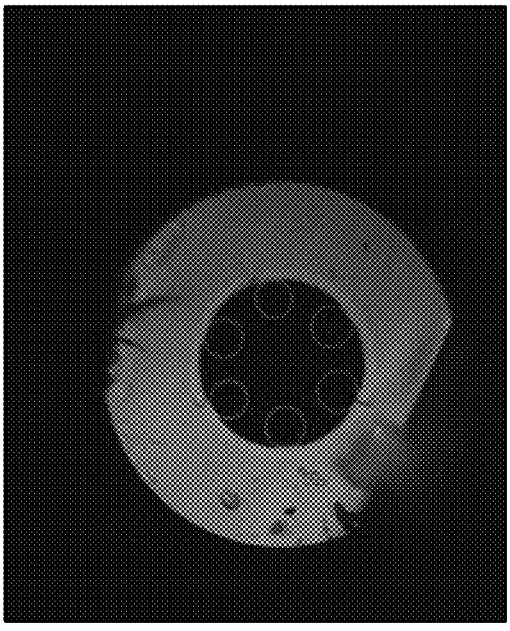
FIG. 9A depicts a cross section of the hollow-core optical fiber of Example 3.

The beginning and end of the hollow-core optical fiber were observed and are depicted in FIGS. 9A and 9B. The hollow-core optical fiber had a length of about 1250 m and was formed from about 400 mm of a hollow-core preform. As shown in FIGS. 9A and 9B, the structure of the hollow-core optical fiber remained consistent over the length of the hollow-core optical fiber, showing that there was little deviation from the intended structure of the hollow-core optical fiber. Thus, it is possible to produce a hollow-core optical fiber including multiple capillaries with controlled dimensions (diameter, wall thickness), where only the centerline pressure applied to the hollow-core preform is controlled through the draw process. That is, with the methods disclosed herein, hollow-core optical fibers with controlled capillary and hollow core dimensions can be produced through regulation of a single process variable (pressure applied to the internal cavity of the hollow-core preform).

The present disclosure is directed to various embodiments of methods for making an optical fiber. The methods may include drawing an optical fiber from a hollow-core preform. The hollow-core preform may comprise an annular support structure with an inner surface defining a hollow cavity. The hollow cavity may comprise a capillary in direct contact with the inner surface of the annular support structure. The capillary may comprise a wall defining an internal opening, the internal opening having a sealed end. The drawing may comprise regulating a pressure of the hollow cavity to a predetermined pressure.

It will be apparent to those skilled in the art that various modifications and variations can be made to the embodiments described herein without departing from the spirit and scope of the claimed subject matter. Thus, it is intended that the specification cover the modifications and variations of the various embodiments described herein provided such modification and variations come within the scope of the appended claims and their equivalents.

The invention claimed is:

1. A method for producing a hollow-core optical fiber, the method comprising:

drawing a hollow-core optical fiber from a hollow-core preform, the hollow-core preform comprising an annular support structure with an inner surface defining an interior cavity, the interior cavity comprising a sealed tube in contact with the inner surface, the sealed tube comprising a wall defining an internal opening, the internal opening having a sealed end opposite a draw end, the drawing comprising regulating a pressure of the interior cavity to a predetermined pressure from 0.5 psig to 3.0 psig, the regulating the pressure of the interior cavity carried out by a manifold disposed proximate to the sealed end of the sealed tube and configured to supply a gas to the interior cavity without introducing gas into the sealed end of the sealed tube.

2. The method of claim 1, wherein the interior cavity comprises two or more sealed tubes.

3. The method of claim 1, wherein the interior cavity further comprises an open tube in contact with the inner surface, the open tube comprising a wall defining an internal opening, the internal opening lacking a sealed end.

4. The method of claim 1, further comprising forming the sealed end of the internal opening.

5. The method of claim 1, wherein the sealed tube is in direct contact with the inner surface of the annular support structure.

6. The method of claim 1, wherein the drawing varies a diameter of a capillary of the hollow-core optical fiber, the capillary formed from the sealed tube during the drawing.

7. The method of claim 1, wherein the drawing varies a thickness of the wall of a capillary of the hollow-core optical fiber, the capillary formed from the sealed tube during the drawing.

8. The method of claim 1, wherein the predetermined pressure is varied in time.

9. The method of claim 1, wherein the regulating the pressure of the hollow cavity comprises passing one or more gasses into the hollow cavity.

10. The method of claim 1, wherein the regulating the pressure varies a diameter of a capillary of the hollow-core optical fiber, the capillary formed from the sealed tube.

11. The method of claim 1, wherein the sealed tube comprises a nested tube, the nested tube in contact with an interior surface of the wall of the sealed tube.

12. The method of claim 1, wherein the sealed end comprises a material of the tube fused to itself.

\* \* \* \* \*